UNITED STATES PATENT OFFICE.

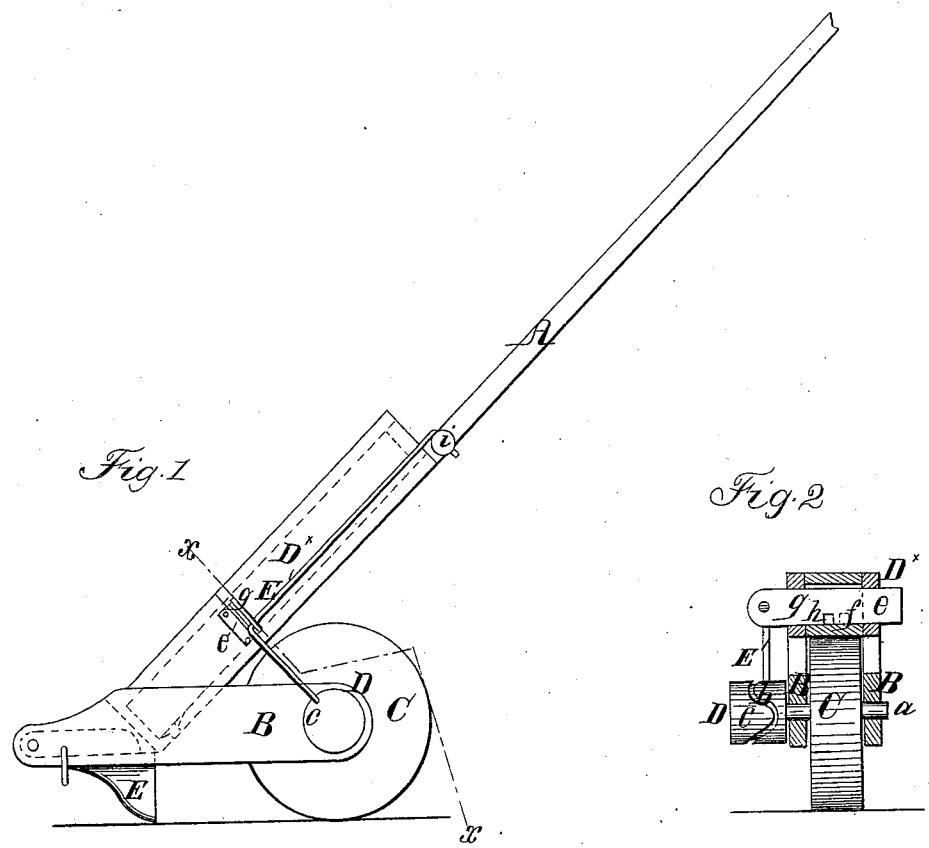

H. V. DAVIS AND GEORGE W. PEABODY, OF AMHERST, ASSIGNORS TO GEORGE W. PEABODY, OF AMHERST, AND CHARLES B. TUTTLE, OF MILFORD, NEW HAMPSHIRE.

IMPROVEMENT IN SEED-DRILLS.

Specification forming part of Letters Patent No. 59,123, dated October 23, 1866.

*To all whom it may concern:*

Be it known that we, H. V. DAVIS and GEORGE W. PEABODY, of Amherst, in the county of Hillsborough and State of New Hampshire, have invented a new and Improved Seed-Drill; and we do hereby declare that the following is a full, clear, and exact description thereof, which will enable those skilled in the art to make and use the same, reference being had to the accompanying drawings, forming part of this specification, in which—

Figure 1 is a side view of our invention; Fig. 2, a transverse section of the same, taken in the line $x\ x$, Fig. 1.

Similar letters of reference indicate corresponding parts.

This invention relates to a new and improved seed-drill of that class which are operated by hand—that is to say, shoved along by the operator, no team or horse being required to perform the work.

A represents a bar, which serves as a handle for the device, and B B are two strips, which are attached to the lower end of bar A, one at each side of the same, and forming acute angles therewith, as shown in Fig. 1. Between the rear ends of the strips B B there is a roller, C, the axle $a$ of which has its bearings in the strips B B, the axle $a$ extending through one of the strips B, and having upon it a cam, D, formed of a zigzag groove, $b$, made in the periphery of a small wheel, $c$. (See Fig. 2.)

On the lower part of the bar A there is a box, $D^\times$, in which the seed to be planted is placed, and between the front ends of the strips B B a furrow-opener, E, is secured by a pivot, $d$.

In the box $D^\times$ there is placed transversely a partition-plate, $e$, having a hole, $f$, made in it at about its center. The plate $e$ is fixed or stationary, and directly behind the plate $e$ there is a reciprocating plate, $g$, having a hole, $h$, made in it. This plate $g$ extends entirely through the box $D^\times$, and through one end of the plate $g$ a bent rod, E', passes, the rear end of the latter being attached to an arm, $i$, on the bar A, and the opposite end extending down and fitting in the groove $b$ of the cam D. In the lower part of the box $D^\times$ a hole is made to allow the seed to pass out from the box.

The seed is placed in the box $D^\times$, above the partition-plate $e$ and reciprocating plate $g$. As the machine is shoved along a reciprocating motion is given the plate $g$ by means of the cam D and rod E', and the seed passes from the upper part of the box $D^\times$ through the holes $f\ h$ in the plates $e\ g$, as said rollers come in line with each other at each movement of $g$, the seed, after passing through the holes $f\ h$, rolling down to the lower end of the box $D^\times$, and passing out at the hole therein, and dropping into the furrow made by the opener E, the roller C covering the seed.

This device may be manufactured at a small cost, and it will prove to be a valuable affair for sowing small seeds in drills.

Having thus described our invention, what we claim as new, and desire to secure by Letters Patent, is—

The bar A, having the seed-box $D^\times$ secured upon its lower part and the strips B B attached to its lower end, and with the roller C between their rear ends, and the furrow-opener E at their front ends, in combination with the fixed perforated plate $e$ in box $D^\times$, and the reciprocating perforated plate $g$ at the rear of plate $e$, operated by the rod E' and cam D from the axis of the roller C, substantially as shown and described.

HERMON V. DAVIS.
GEORGE W. PEABODY.

Witnesses:
CHARLES RICHARDSON,
SUSIE A. FEW.